June 25, 1946.                A. BOYNTON                 2,402,728
                            FLOW INTERMITTER
                         Filed Sept. 29, 1941         3 Sheets-Sheet 1
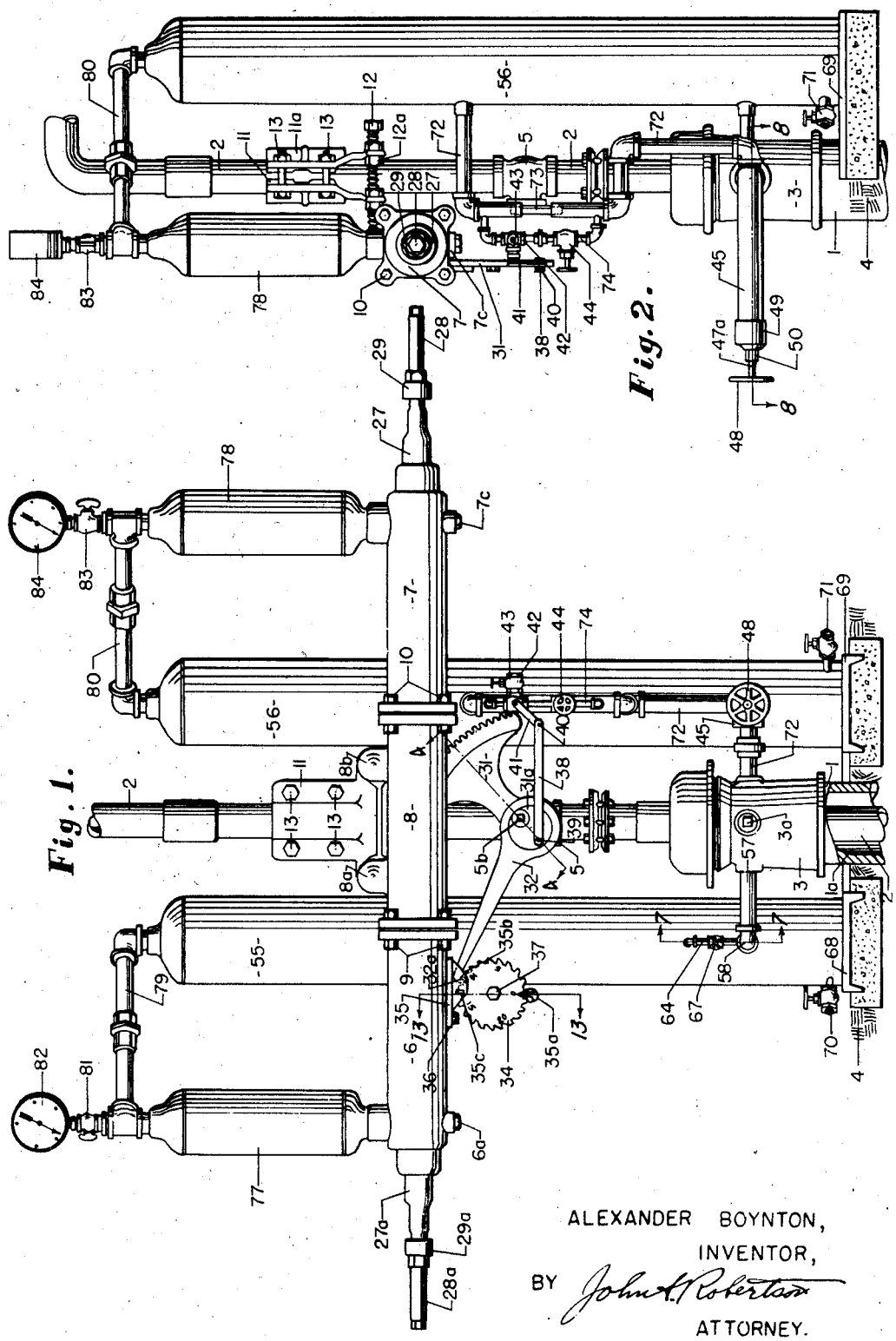
ALEXANDER BOYNTON,
        INVENTOR,
BY  *John A. Robertson*
        ATTORNEY.

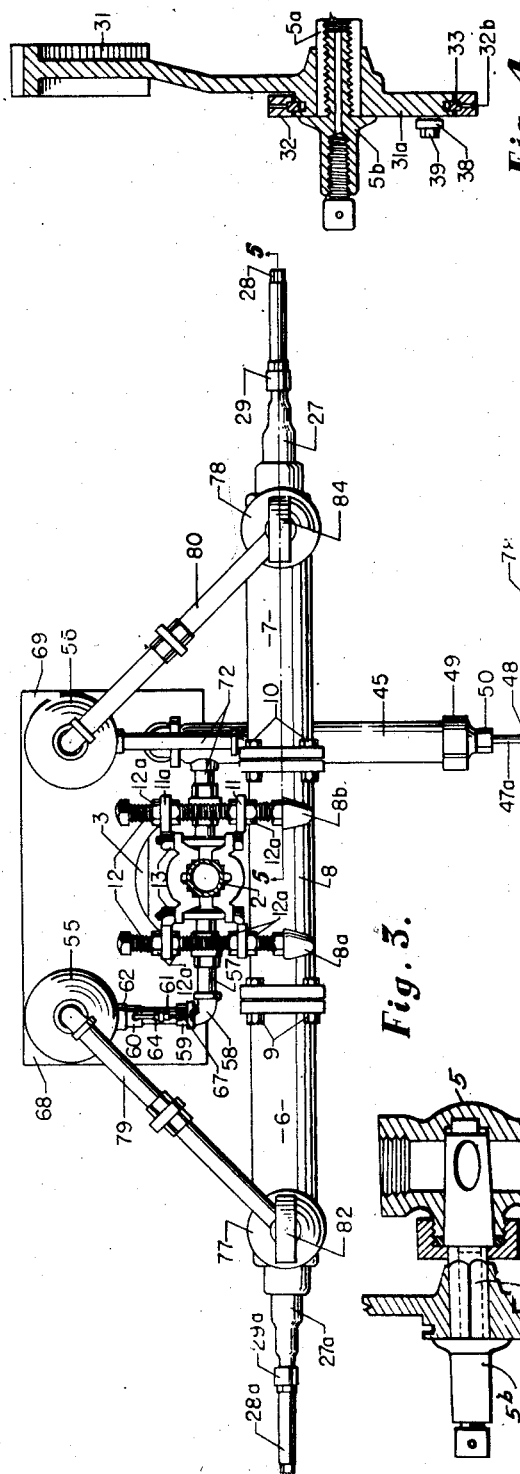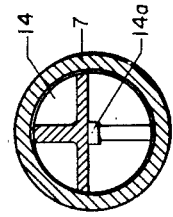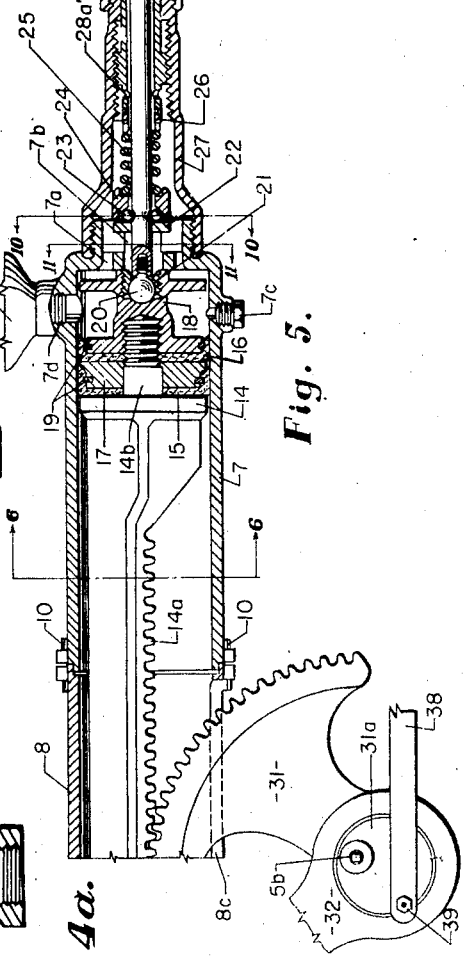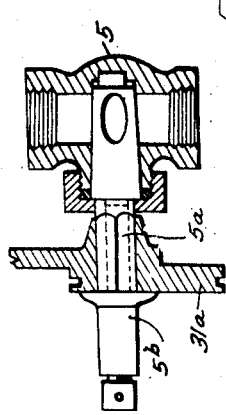

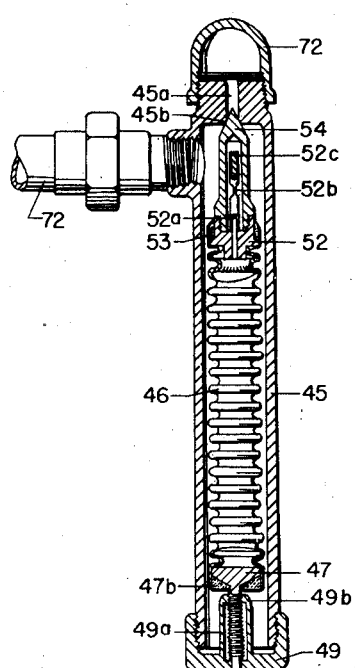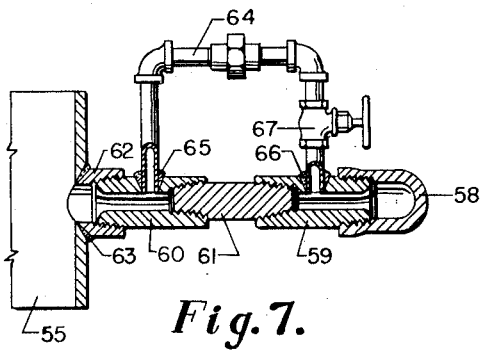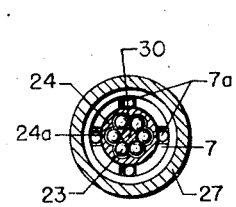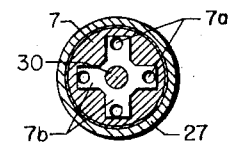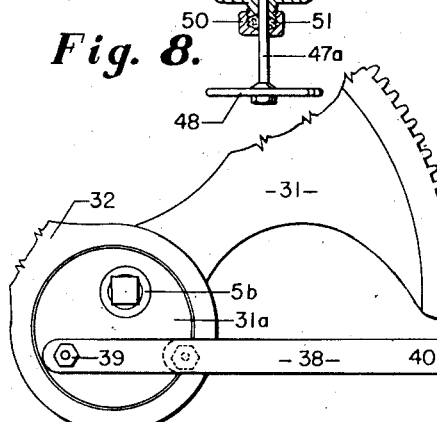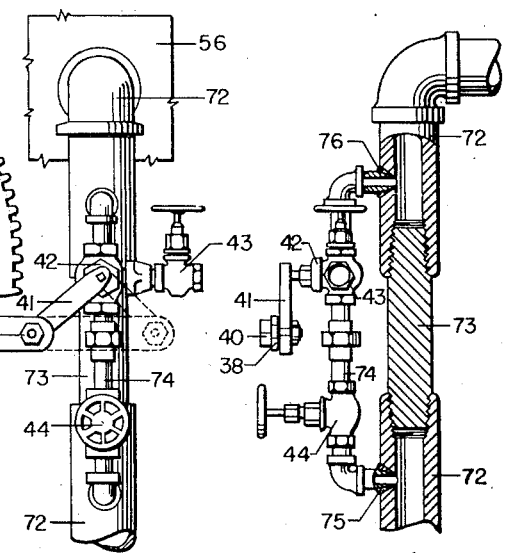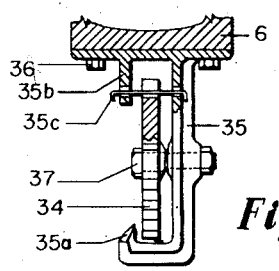

Patented June 25, 1946

2,402,728

UNITED STATES PATENT OFFICE 2,402,728

FLOW INTERMITTER

Alexander Boynton, San Antonio, Tex.; Sida S. Martin executrix of said Alexander Boynton, deceased Application September 29, 1941, Serial No. 412,871

9 Claims. (Cl. 137—145)

My invention relates to flow intermitters for cased wells, and deals with the subject matter of my Patents No. 2,263,565, issued November 25, 1941; No. 2,262,750, issued November 18, 1941; No. 2,370,140, issued February 27, 1945; and No. 2,372,656, issued April 3, 1945.

The principal object is to provide automatic means above the ground surface for causing a well to flow at predetermined intervals and during predetermined lengths of time and at predetermined pressures relatively lower than the pressure obtaining within the well.

Another object is to provide an automatic flow intermitter wherein all of the power from the driving to the driven parts is transmitted practically on the center line of the piston or driving member in order to provide maximum power efficiency.

Another object is to provide a flow intermitter which will be operated by pressure fluid of two different values, each less than that of the pressure fluid in the well.

A final object is to record the number of flowing operations during known intervals. Other objects will in part be obvious and in part be pointed out hereinafter.

In accomplishing the foregoing objects by means of the preferred construction wherein relatively low pressures are employed, I place a two latch-governed piston assembly within two aligned cylinders, the latches being of the spring and balls type disclosed in my copending application, Serial No. 276,193, filed April 10, 1939. The central portion of the piston assembly is formed into a rack engageable with a segment gear adapted to operate a valve in the flow tubing. One end of the piston assembly has contact with pressure fluid in a low pressure reservoir, and the other end has contact with pressure fluid in a second reservoir, the pressure in the latter being alternately greater and less than that within the low pressure reservoir, and always less than that obtaining within the well. A pop valve between the well and the second reservoir prevents gas from entering same unless and until a predetermined value of pressure fluid obtains within the well. When the gas in the second reservoir reaches a predetermined value greater than that obtaining within the low pressure reservoir, the piston is driven to open the flow tubing valve and, at the same time, to open a bleeder valve draining the second reservoir. When the pressure becomes depleted in the second reservoir to a predetermined less value than that obtaining in the low pressure reservoir, the piston is driven back in the direction of the depleted pressure fluid; thereby closing the tubing valve and thus causing the well to flow during predetermined times, and to be closed in during predetermined intervals, as will more fully appear further on.

The construction and operation of this intermitter will become clear from examination of the following specification and the accompanying drawings, in which—

Fig. 1 is a front view of the preferred embodiment of the intermitter.

Fig. 2 is a side view of the intermitter illustrated in Fig. 1.

Fig. 3 is a top view of the intermitter illustrtaed in Figs. 1 and 2.

Fig. 4 is a section on the line 4—4 Fig. 1.

Fig. 4a is a detail view, partly in section, of the valve 5 and its connection to the eccentric hub of the segment gear.

Fig. 5 is a vertical section through a portion of the piston, latch, and cylinder assemblies on the line 5—5 Fig. 3.

Fig. 6 is a cross-section on the line 6—6 Fig. 5.

Fig. 7 is mainly a longitudinal section on the line 7—7 Fig. 1.

Fig. 8 is a section through the pop valve assembly on the line 8—8 Fig. 2.

Fig. 9 is an enlarged partial side view of Fig. 1 showing the valve controlling means for pressure fluid employed to operate the intermitter.

Fig. 10 is a cross-section on the line 10—10 Fig. 5 and illustrates the means for maintaining the latch balls evenly spaced around the latch shaft.

Fig. 11 is a cross-section on the line 11—11 Fig. 5.

Fig. 12 is an enlarged side view, partially in section, of the valve controlling means for pressure fluid in Fig. 2.

Fig. 13 is a cross-section on the line 13—13 Fig. 1.

Similar characters of reference are employed to designate similar parts throughout the several views.

With particular reference to the embodiment, most completely illustrated in Figs. 1 and 2, the flow tubing 2 extending into the well centrally of the casing 1, is surrounded by the annular space 1a. The casing head 3 has one of its lateral openings closed by the plug 3a. It is located in proximity to the ground surface 4 and forms a hermetic seal between the casing and the tubing, the latter having the valve 5 connected into it.

The clamp halves 11 and 11a may be secured firmly upon the tubing 2 by the bolts 13. The long bracket bolts 12, Figs. 2 and 3, having connection into the bracket bosses 8a and 8b of the cylinder spacer shell 8 are slidable through openings in the clamp halves 11 and 11a and are secured upon the clamp halves by the nuts 12a which provide means by which the shell 8 may be moved toward or away from the tubing 2 for the purpose of causing the gear teeth of the piston 14 to enmesh properly with the mating teeth of the segment gear 31 when the clamp halves 11 and 11a are spaced at proper distance from the valve 5. This adjustable relation between the tubing 2 and the shell 8 enables the intermitter to be adapted without modification to cause true registration of the mating rack and gear teeth and enables a similar registration between the segment gear 31 and the slot 8c of the shell 8 for installation of the intermitter upon tubings of different sizes to operate valves of correspondingly different sizes.

The low pressure reservoir 55 supported upon the base 68 has the boss 62 secured upon it by the weld 63 (see Fig. 7). The lower portion of this reservoir is connected with the casing head 3 by the nipple 57, the elbow 58, the nipples 59 and 60, and the solid rod 61 which connects the latter two nipples. The loop conduit 64 having the valve 67 has its ends connected into the nipples 59 and 60 by the welds 65 and 66. This loop conduit provides a small line suitable to have the small needle valve 67 connected into it, while the stronger connections supporting the loop line supply the desirable strength to resist shocks and strains frequently occurring during the operation of machinery around oil wells. When the desired pressure has been established in the reservoir 55, the valve 67 is turned to its closed position. This valve is manually controlled to maintain a predetermined pressure in the reservoir 55.

The oil reservoir 77 has connection with the low pressure cylinder 6 and with the pressure fluid conduit 79 which also has connection with the low pressure reservoir 55, the valve 81 and the pressure gauge 82 being connected into the conduit 79.

The high pressure reservoir 56 supported upon the base 69 has connection with the casing head 3 by means of the bracket of fittings 72, all being tubular except the solid plug rod 73 (see Figs. 1 and 12).

The oil reservoir 78 has connection with the high pressure cylinder 7 and with the conduit 80 which has connection with the high pressure reservoir 56, the valve 83 and the pressure gauge 84 being secured upon said conduit.

It will be understood that the oil reservoirs 77 and 78 are to be partially or entirely filled with lubricating oil in order that the piston, in its movements, will be followed by this oil under pressure from the reservoirs 55 and 56 which provides proper lubrication of the cylinders 6 and 7.

The valve 70 is adapted to drain the reservoir 55 and the valve 71 is adapted to drain the reservoir 56. The plug 6a is adapted to drain oil out of the cylinder 6, and the similar plug 7c is adapted to drain oil out of the cylinder 7.

The loop conduit 74 (see Fig. 12) connected into the bracket of fittings 72 by the welds 75 and 76 has the inlet valve 44 for controlling the rate of pressure build-up in the reservoir 56 and the three-way valve 42 having the bleeder valve 43 connected to its lateral or discharge opening. The three-way valve is adapted in one position to open the conduit 74 straight through and in another position to close the conduit 74 below it and open this conduit above it to drain the reservoir 56 through the bleeder valve 43. All of said last three feeding and bleeding valves being small, the small conduit 74 is provided for them, while the more rugged bracket of fittings 72 provides proper support for the latter conduit.

The pop valve now to be described will be found somewhat similar to, but simpler in construction than the pressure relief valve shown in my Patent No. 2,055,465, issued September 29, 1936. The pop valve housing 45 (this numeral being employed also to refer to the pop valve generally) has connection into the bracket of fittings and connections 72 as appears in Fig. 8 (see also Fig. 2). The metallic bellows 46 has one end hermetically closed by the outer end connection 47 and the solder or weld 47b. The other end of the bellows is closed hermetically by the inner end connection 52 and the solder or weld 53. The connection 52, which preferably may be of copper or soft brass, has a tubular extension 52a through which liquid and compressed air or other gas may be placed in the bellows and confined therein by mashing the tube together firmly as illustrated at 52b and then by closing the tube with silver solder or the like as is indicated at 52c. The pop valve member 54 engageable with the seat 45b formed around one end of the passage 45a of the housing 45 and having an axial opening to freely receive the extension 52a may be threadedly secured upon the connection 52 so that the tubular extension 52a will be accessible always for recharging the bellows 46 with liquid or gas as necessary repairs or need for a change of pressure within the bellows may require.

The outer end of the housing 45 is closed by the cap 49 having an axial internal projection 49a which has an inner threaded portion 49b engageable with the threaded portion of the extension 47a of the connection 47, for the purpose of providing means for regulating the force exerted by the valve member 54 upon its seat 45b. The handle 48 upon the extension 47a provides convenient means for making such adjustments. The gland 50 threadedly engaged upon an axial extension of the cap 49 is adapted to compress the packings 51 for the evident purpose of preventing leakage along the extension 47a.

The installation and operation of the pop valve will be described now as follows: The metallic bellows 46 which may be of one, two or three-ply stainless steel or Monel metal preferably should be filled partially with a liquid such as glycerine, castor oil or ordinary lubricating oil. An air pocket should be provided within the bellows so as to limit the compression thereof in order that it will not be damaged by excessive external fluid force.

The air pocket preferably should be under sufficient compression to stretch the bellows somewhat in order that it will operate partially in stretch and partially in compression; thus limiting its movements in both directions from its normal or free length. This practice enables the employment of shorter bellows than would be required otherwise and, at the same time, prolongs the life of the bellows in service.

Manifestly turning the handle 48 so as to force the valve member 54 more firmly upon the seat 45b will increase the external force required upon the bellows to compress it and open the valve, and vice versa. If, for example, it is desired that the tubing valve 5 should open only when there is 200 pounds or more of pressure fluid in the annular space 1a, the pop valve, closed at all lesser pressures, will be set to open at 200 pounds, and so on for different pressures.

The bellows manufacturing art has progressed now so far that stainless steel and Monel metal used in forming them can be relied upon to supply the necessary spring action. This fact accounts for my omission of the internal spring as was employed in the bellows shown in my Patent No. 2,055,465.

In the cylinder assembly cylinders 6 and 7, within which the piston 14 is slidable closely, are spaced by the shell 8 and secured in alignment therewith by the bolts 9 and 10, the piston having relatively large clearance within the shell. The central portion of the piston is ribbed as appears in Fig. 6, and has its central portion formed into a rack 14a, adapted to operate the segment gear 31 as appears in Fig. 5. In assembling the rack and segment gear the mating teeth are enmeshed in such manner that the valve 5 will be closed when the piston is in one extreme position, as appears in Figs. 4a and 5, and will be open when the piston moves to the corresponding extreme position in the other cylinder.

One end of the piston assembly will be described now, it being understood that each end thereof is a duplicate of the other, that the cylinders 6 and 7 are alike, and that the latching mechanism shown in Fig. 5 is duplicated at the other end of the piston and cylinder assembly within the latch housing nipple 27a, the latch adjusting nipple 28a, and the gland 29a (see Fig. 1).

Over the axial extension 14b of the piston, the leather, fabric or pliable composition cups 15 and 16 are fitted and expanded by the spreader rings 19 to securely confine lubricating oil within the cylinder. These cups are spaced by the ring 17. The clamp ring 18 having threaded engagement with the extension 14b is employed to secure the cups and to house the ball-shaped head of the ball-headed stud 20, this stud having connection with the latch shaft 30 and the head being secured in place by the bearing ring 21 threadedly connected with the clamp ring 18.

The ball seat plate 22 and the ball rider 24, through both of which the latch shaft 30 is slidable, engage the latch balls 23 between them by force of the coiled latch spring 25 which is free over the shaft 30 and has its ends engaged between the ball rider 24 and the spring shoe 26, the latter being movable over the shaft 30 to control the force of the spring by means of the threaded engagement between the latch adjusting nipple 28 and the latch housing nipple 27 which has threaded engagement with the cylinder 7.

The latch balls 23 are adapted to engage within a recess formed around the shaft 30 when the shaft is at the extremity of its travel in one direction as appears in Fig. 5. The latch shaft is of such length that it will remain between the balls when the piston assumes its extreme position in the opposite direction, this relation between the balls and the shaft serves to preserve the assembled relation between them at all times, because the latch balls might fall into the open space within the nipple 27 if the shaft 30 were short enough to move out from between them when the piston moves to its other extreme position. The gland 29 threadedly engaged over the nipple 27 compresses the packing 29b so that fluid within the cylinder 7 is confined within the latching mechanism.

The ball rider 24 is slotted longitudinally, as appears at 24a in Fig. 10, for the purpose of spacing and separating the balls in order that they will move truly inward and outward as the latch is operated. Were it not for these spaced longitudinal slots it is apparent that the latch balls would tend to gravitate toward the lower side of the latch shaft and thus fail to exert an evenly distributed force around it. The duplicated latching mechanism will be lubricated by oil within the reservoirs 77 and 78, the oil moving in and out through the opening 7d as the piston operates.

It will be noted that the bores 7a communicating with the slots 7b of the cylinder 7 and the lateral openings 28a' through the nipple 28 provide for free circulation of a lubricant in and out of the latch housing members as the latch shaft moves with the piston. This circulation means provides that the latch will not become impinged upon the lubricant as the latch moves in one direction and will not pull an appreciable vacuum when moving in the other direction.

The ball-headed stud 20, by allowing lateral freedom to the latch shaft 30, prevents this shaft from developing a lateral thrust, due to possible imperfect alignment between it and the nipples 27 and 28.

The purpose of the double latching means will be understood as providing that the piston movement in each direction will be delayed until sufficient force is exerted upon the piston to complete each valve operating movement quickly.

It will be observed that the small clearance around the clamp ring 18 provides a dashpot effect to cushion the piston impact upon the end of the cylinder 7, this cushioning action taking place after the clamp ring passes outward of the opening 7d.

The segment gear or operating arm 31 has an eccentric hub 31a which has a square operating shank 5a of the valve 5 is secured by the flanged portion of the lubricator plug 5b (see Figs. 4 and 4a).

The driver arm 38 is hinged upon the eccentric hub 31a by the cap screw 39 and is hinged at its other end to the valve arm 41 of the three-way valve 42 by means of the cap screw 40 (see Figs. 1, 9 and 12).

The circular external surface of the hub 31a is finished to rotatably receive the annular portion of the counter arm 32, the compressible ring 33 (see Fig. 4) being adapted to rockably secure the counter arm upon the hub. The normal diameter of this ring is such that the ring will engage partially within opposite circular grooves of the hub and arm, it being understood that a transverse segment of the ring is cut away so as to allow the ring to be compressed. The openings 32b are provided in order that the ring may be compressed as stated by means of a nail or the like so as to enable the arm and eccentric to be assembled and taken apart conveniently.

The counter bracket 35, secured to the cylinder 6 by the bolts 36, supports the counter ratchet wheel 34 by means of the axle bolt 37 upon which bolt the wheel is rotatable. The counter arm 32 has a hook 32a which engages by gravity with the peripheral notches of the wheel 34 in order to move it one step at a time, the steps being indicated by numerals on the wheel, these numerals being arranged and spaced so that one of them will be designated by the pointer 35a at each stroke of the piston as the tubing valve 5 is opened.

The double flanges 35b have slight clearance over the outer end of the counter arm 32 and guide the hook 32a of the arm to engage the peripheral teeth of the counter ratchet wheel. The straight spring wire 35c is secured loosely through the doubel flanges 35b and has its protruding ends bent to secure it in position (see Fig. 13). This wire normally engages between the teeth of the ratchet wheel and springs enough to allow the teeth to pass over it, one at a time; thus properly positioning each tooth, in its turn, to be engaged by he hook 32a when the tubing valve 5 closes as in Fig. 1.

The foregoing counter mechanism is somewhat similar in operation to that shown in my recent Patent No. 2,262,750, issued November 18, 1941, but is thought to patentably distinguish therefrom.

Without expressed or implied limitation as to other and further uses, the best presently known mode for applying this invention will be described now.

To flow a well intermittently with low pressure, the flowing time and the intervals between flows being predetermined and variable as may be desired, the following facts and requirements will be assumed for illustration:

1. 250 pounds ordinarily is available in the annular space 1a to flow the well, this force being supplied by the well or by means of a source of pressure fluid connected to the lateral casing head boss shown closed by the plug 3a.

2. 200 pounds is the minimum value of the pressure fluid to be employed in the annular space 1a to flow the well, that being the minimum pressure at which the well will flow satisfactorily.

3. The well is to flow one hour, and the interval between flows is two hours.

4. 50 pounds of pressure fluid is confined within the reservoir 55.

5. The latches are adjusted so that with slight pressure, such as a differential force of 25 pounds per square inch greater within one of the cylinders as compared to the pressure within the other cylinder, the piston will move and alternately close and open the tubing valve 5, this valve being closed when the segment gear 31, the valve arm 41, and the counter arm 32 are in the position shown in Fig. 1, the right end of the piston and the right unit of the latch at that time being shown in Fig. 5.

6. The pop valve assembly 45 (see Fig. 8) is set so that 200 pounds of external pressure upon the bellows 40 will open the valve 54, which remains closed until then.

7. The valve 44, which preferably should be a 1/8" to 1/4" needle valve, is set so that two hours will be required to charge the reservoir 56 from 25 pounds to 75 pounds (it being borne in mind that 25 pounds differential will operate the piston in either direction).

8. The bleeder valve 43, which may be a 1/8" to 1/4" needle valve, is set so as to discharge pressure fluid out of the reservoir 56 from 75 pounds down to 25 pounds during one hour.

9. The piston 14 has just arrived at the extreme right position, at which time the three-way valve 42 opens the conduit 74 below it and closes the conduit above it to prevent draining the reservoir 56 through the bleeder valve 43. The conduit 74 will be closed straight through again and the bleeder discharge into the valve 43 will be opened when the piston moves to its other extreme position, at which time the driver arm 38 and the three-way valve arm 41 will be in the position indicated by the dotted lines in Fig. 9.

Under the foregoing assumptions the pop valve will remain open and perform no other service as long as the pressure within the annular space 1a remains above 200 pounds.

The problem is so simple that merely stating it suggests the answer. The resulting operations are as follows:

1. The pop valve will remain open (see assumptions 1 and 6).

2. The piston will remain at the extreme right as in Figs. 1 and 5 for two hours, during which time the tubing valve 5 will be closed. At the end of two hours the pressure will have been built up to 75 pounds within the reservoir 56 and then will force the piston to its other extreme position; thereby opening the tubing valve 5 (see assumptions 3, 4, 5, and 7).

3. The tubing valve 5 will remain open for one hour while the pressure fluid is bleeding down out of the reservoir 56 from 75 pounds to 25 pounds, at the end of which time the piston 14 will move again to the right and repeat the closing of the tubing valve 5 as appears in Figs. 1, 5, and 9 (see assumptions 3, 4, 5, and 8).

If, during the repetition of the operating cycle above described, the pressure fluid value in the annular space 1a should become depleted to less than 200 pounds, the pop valve will seat and the opening of the tubing valve 5 will be deferred thereby until the minimum pressure required to flow the well satisfactorily becomes reestablished within the annular space 1a.

It is apparent that the pop valve assembly may be omitted from the installation and that the intermitter can be operated without it. If the pop valve be omitted, however, the tubing valve 5 will be opened, even though the pressure within the annular space 1a should become depleted down to as low as 75 pounds (see assumptions 4 and 5).

Danger of such low pressure force opening the tubing valve 5, if the pop valve be omitted, can be overcome, however, by increasing the pressure within the reservoir 55, but this is not desirable, especially if intermittently occurring pressures are employed to flow the well. If the pop valve be omitted the pressure within the reservoir 55 then will have to be maintained at 25 pounds less than the pressure in the annular space 1a. (Still assuming that 25 pounds differential will operate the piston.) Such increase of the pressure employed to operate the intermitter, of course, would greatly increase its cost and would tend also to shorten the efficient life of the U-cups 15 and 16. If, however, there is an ample supply of pressure fluid within the well at all times, the pop valve may be omitted and low pressure may be employed then in the manner previously stated, provided the valve 44 be adjusted properly to provide the required time for building up pressure within the reservoir 56.

It is obvious that many mechanical changes, substitutions, and adaptations may be made in the illustrative construction and that some minor parts may be omitted while equivalent parts and combinations may be substituted for those shown; and I reserve the right to make such mechanical changes, substitutions, combinations, omissions, and adaptations within the scope of the invention as herein disclosed and illustrated.

Where introductory expressions and functional statements are employed in the claims to follow, it will be understood that such expressions and statements relate to the best presently known mode of applying the invention, and are not to be regarded as limitations upon the claims, which contemplate that the invention will be applied to other and various uses.

I claim:

1. In a flow intermitter: tubing; a cylinder assembly upon said tubing, said assembly having a low pressure and a high pressure end; a piston in said assembly, said piston having a rack thereon; a low pressure receiver fluidly connected to said low pressure end; a high pressure receiver fluidly connected to said high pressure end; means for charging said low pressure receiver with low pressure fluid; a conduit for communication between said high pressure receiver and a suitable source of high pressure fluid; valve charging and discharging means on said conduit, said means being adapted to alternately charge and discharge said high pressure receiver; a tubing valve in said tubing; means on said piston and valve to operate said tubing valve; and means operable by said piston to operate said charging and discharging means so that said charging and discharging means will charge said high pressure receiver when said tubing valve is closed and discharge from same when said tubing valve is open.

2. In a flow intermitter: a piston assembly; a tubing valve in spaced relation to said assembly; a rack carried by and extending axially of said piston assembly; a gear means upon said valve, said means being operable by said rack to open and close said valve; a low pressure receiver having pressure fluid therein in communication with one end of said piston; means for charging said low pressure receiver with a constant value of low pressure fluid; a high pressure receiver having pressure fluid therein in communication with the other end of said piston; a fluid connection between said high pressure receiver and a suitable source of high pressure fluid, said connection comprising two duct sections with a plug rod between them, a by-pass duct for effecting communication between said two duct sections and by-passing said last named plug rod, an inlet timing valve and a three-way valve connected in said by-pass duct, said three-way valve having an arm; a bleeder timing valve operatively connected with said three-way valve and adapted to control the rate of pressure fluid discharged from said high pressure receiver, said three-way valve being so arranged that in one position it establishes communication between the high pressure receiver and the inlet valve in the duct while closing off communication with the bleeder valve and that in a second position it establishes communication with the bleeder valve and receiver while closing off communication with the duct inlet valve; and means on said gear cooperating with said arm to operate said three-way valve so as to decrease the pressure fluid in said high pressure receiver when said tubing valve is open, and to charge said last receiver when said tubing valve is closed.

3. In a flow intermitter: a piston assembly; a tubing valve in spaced relation to said assembly; a rack upon said piston assembly; a gear means upon said valve, said means being operable by said rack to open and close said valve; a low pressure receiver having pressure fluid therein in communication with one end of said piston; a high pressure receiver having pressure fluid therein in communication with the other end of said piston; a duct upon said high pressure receiver; a plug rod in said duct; a by-pass conduit by-passing said plug rod, said duct and by-pass conduit communicating between said high pressure receiver and a suitable source of high pressure fluid; an inlet timing valve in said by-pass conduit; a three-way valve in said by-pass conduit, said three-way valve being arranged so that in one position it establishes communication between the high pressure receiver and the inlet valve in the by-pass while closing off communication with the atmosphere and that in a second position it establishes communication between the high pressure receiver and the atmosphere while closing off communication with the inlet timing valve; and means on said gear to operate said three-way valve so as to decrease the pressure fluid in said high pressure receiver when said tubing valve is open, and to charge said last receiver when said tubing valve is closed.

4. In a flow intermitter; a cylinder assembly, said assembly having a high pressure end and a low pressure end; a piston assembly in said cylinder assembly; a low pressure receiver communicating with said low pressure end and having low pressure fluid therein; a high pressure receiver communicating with said high pressure end; a tubing valve; an operating arm on said valve; means on said piston to operate said arm; a mechanical counter on said cylinder assembly; a suitable source of high pressure fluid; charging and discharging means arranged to be alternately operated to charge said receiving means from said source and to discharge said receiver; and means on said operating arm to actuate said counter and said charging and discharging means so that the pressure within said high pressure receiver will be alternately greater and less than the pressure within said low pressure receiver to alternately move said piston in one direction and then another to alternately open and close said tubing valve and to alternately operate said charging and discharging means.

5. In a flow intermitter: a cylinder assembly, said assembly having a high pressure end and a low pressure end; a piston assembly in said cylinder assembly; a low pressure receiver communicating with said low pressure end and having low pressure fluid therein; a high pressure receiver communicating with said high pressure end; a tubing valve; an operating arm on said valve; means on said piston to operate said arm; a suitable source of high pressure fluid; charging and discharging means arranged to be alternately operated to charge said receiving means from said source and to discharge said receiver; and means on said operating arm to actuate said charging and discharging means so that the pressure within said high pressure receiver will be alternately greater and less than the pressure within said low pressure receiver to alternately move said piston in one direction and then another to alternately open and close said tubing valve and to alternately operate said charging and discharging means.

6. In a flow intermitter: a cylinder; a piston in said cylinder; a tubing valve in spaced relation to said piston; a pressure fluid receiver for pressure fluid of variable force; a low pressure receiver for pressure fluid of a constant force; a constant pressure fluid force in said low pressure receiver; a source of pressure fluid for said variable pressure fluid receiver; feeder means in communication with the source of pressure and the variable pressure receiver for admitting pressure fluid into said variable pressure receiver; a pop valve in said feeder means to close said feeder means when the pressure of the fluid at the source is less than a predetermined amount; an inlet timing valve in said feeder means; a three-way valve in said feeder means, said three-way valve being so constructed and arranged that in one position it establishes communication between the variable pressure receiver and the inlet timing valve in said feeder means while closing off communication with the atmosphere and that in a second position it establishes communication between the variable pressure receiver and the atmosphere while closing off communication with the inlet timing valve; means to operate said three-way valve so as to intermittently admit pressure fluid from said source to said variable pressure receiver and to intermittently discharge said fluid therefrom; means to transmit said constant force to one end of said piston; means to transmit said variable force to the other end of said piston; and means on said piston and tubing valve to open and close said last valve responsive to the movements of said piston.

7. In a flow intermitter: a cylinder spacer shell; a low pressure cylinder upon one end of said shell; a high pressure cylinder upon the other end of said shell, said shell and said cylinders being in alignment; a piston in said shell and cylinders, said piston being movable between two extreme positions and having a rack and two axial extensions, each said extension having a dashpot clamp ring and a yieldable latch device thereon, said dashpot clamp ring cooperating with the adjacent cylinder to provide a dashpot effect; said latch device being arranged to yieldingly retain said piston in at least one of its extreme positions; a high pressure oil reservoir upon said high pressure cylinder; a low pressure oil reservoir upon said low pressure cylinder; a lubricant in said reservoirs; a low pressure receiver in communication with said low pressure reservoir; a high pressure receiver in communication with said high pressure reservoir; a flow connection between said low pressure receiver and a suitable source of pressure fluid, said connection comprising two pipe sections with a plug rod between them, a by-pass pipe for effecting communication between said two pipe sections and by-passing said plug rod, and an inlet timing valve in said by-pass pipe; a flow connection between said high pressure receiver and said suitable source of pressure fluid, said connection comprising two duct sections with a plug rod between them, a by-pass duct for effecting communication between said two duct sections and by-passing said last named plug rod, an inlet timing valve and a three-way valve connected in said by-pass duct, said three-way valve having an arm; a bleeder timing valve connected to said three-way valve, said three-way valve being so arranged that in one position it establishes communication between the high pressure reservoir and the inlet valve in the duct while closing off communication with the bleeder valve and that in a second position it establishes communication with the bleeder valve and reservoir while closing off communication with the duct inlet valve; a tubing valve; a segment gear upon said tubing valve for effecting movement of the same, said gear being enmeshed with said rack; an eccentric hub upon said segment gear; a drive arm rockably connected between said hub and said valve arm; a counter arm upon said eccentric hub; and a counter ratchet wheel upon one of said cylinders, said counter arm being constructed and arranged to turn said ratchet wheel once for each complete operation of the piston, and said drive arm being constructed and arranged to move said three-way valve to one or the other of its two positions, the arrangement being such that the three-way valve is in its first position when the tubing valve is open and in its second position when the tubing valve is closed.

8. In a flow intermitter: a high pressure receiver; a low pressure receiver; a tubing valve; a low pressure fluid in said low pressure receiver; high pressure fluid in said high pressure receiver; a cylinder in spaced relation to said tubing valve having a piston movable therein; means for operating said tubing valve from said piston so that movement of the piston in opposite directions effects opening and closing of the tubing valve; a conduit between said low pressure receiver and one end of the cylinder; a conduit between the high pressure receiver and the other end of the cylinder; a suitable source of high pressure fluid; a supply conduit between said high pressure receiver and said source of high pressure fluid; an inlet timing valve and an adjustable pop valve in said supply conduit, said pop valve being set to open only at a predetermined fluid pressure; and valve means interposed in the high pressure supply conduit between said high pressure receiver and said inlet timing valve operatively connected with said tubing valve operating means and arranged for alternately effecting increase and decrease in the pressure within said high pressure receiver above and below the pressure within said low pressure receiver to alternately move said piston; and a bleeder valve operatively connected with said valve means to control the rate of decrease of the pressure within said low pressure receiver.

9. In a flow intermitter: a source of high pressure fluid; a cylinder having a piston movable therein; a tubing valve; rack and piston means respectively carried by said piston and valve for effecting opening and closing of said valve upon reciprocation of said piston; a low pressure receiver having a low pressure fluid therein; a duct operatively connecting said low pressure receiver with one end of said cylinder for effecting movement of said piston in one direction; a high pressure receiver having a high pressure fluid therein; a duct operatively connecting said high pressure receiver with the other end of said cylinder for effecting movement of said piston in the other direction; feeding and bleeding means under control of said piston and operatively connected between said source of high pressure fluid and said high pressure receiver for alternately effecting an increase and decrease in the pressure within the high pressure receiver at predetermined times; and a pop valve in the connection between said feeding and bleeding means and said source of high pressure fluid and set to open at a predetermined pressure for purposes described.

ALEXANDER BOYNTON.